(12) United States Patent
Oshimi

(10) Patent No.: US 7,704,295 B2
(45) Date of Patent: Apr. 27, 2010

(54) HONEYCOMB STRUCTURE AND EXHAUST GAS TREATMENT DEVICE

(75) Inventor: Yukio Oshimi, Gifu (JP)

(73) Assignee: Ibiden Co., Ltd., Ogaki-shi (JP)

( * ) Notice: Subject to any disclaimer, the term of this patent is extended or adjusted under 35 U.S.C. 154(b) by 285 days.

(21) Appl. No.: 11/851,300

(22) Filed: Sep. 6, 2007

(65) Prior Publication Data

US 2008/0190081 A1    Aug. 14, 2008

(30) Foreign Application Priority Data

Feb. 9, 2007    (WO) ................. PCT/JP2007/052340

(51) Int. Cl.
*B01D 39/20* (2006.01)
*B32B 3/12* (2006.01)

(52) U.S. Cl. ............................ 55/523; 55/524; 422/180; 428/116

(58) Field of Classification Search ................... 55/523, 55/524; 422/177, 180, 222; 428/116
See application file for complete search history.

(56) References Cited

U.S. PATENT DOCUMENTS

| | | | |
|---|---|---|---|
| 5,916,530 A * | 6/1999 | Maus et al. ................ | 422/179 |
| 6,375,014 B1 * | 4/2002 | Garcera et al. ............. | 210/490 |
| 7,396,586 B2 | 7/2008 | Ohno et al. | |
| 7,427,309 B2 * | 9/2008 | Ohno et al. .................. | 55/523 |
| 7,497,999 B2 * | 3/2009 | Ichikawa ..................... | 422/177 |
| 7,517,502 B2 * | 4/2009 | Ohno et al. .................. | 422/177 |
| 7,556,782 B2 * | 7/2009 | Ohno et al. .................. | 422/180 |
| 2006/0021310 A1 | 2/2006 | Ohno et al. | |
| 2006/0051556 A1 | 3/2006 | Ohno et al. | |
| 2006/0068159 A1 | 3/2006 | Komori et al. | |
| 2006/0093784 A1 | 5/2006 | Komori et al. | |
| 2007/0178275 A1 | 8/2007 | Takahashi | |
| 2007/0196620 A1 | 8/2007 | Ohno et al. | |
| 2007/0212517 A1 | 9/2007 | Ohno et al. | |
| 2008/0083202 A1 | 4/2008 | Kunieda et al. | |
| 2008/0120950 A1 | 5/2008 | Ohno et al. | |
| 2008/0136062 A1 | 6/2008 | Kasai et al. | |
| 2008/0138567 A1 | 6/2008 | Ninomiya et al. | |
| 2008/0174039 A1 | 7/2008 | Saijo et al. | |
| 2008/0190083 A1 * | 8/2008 | Oshimi ........................ | 55/521 |
| 2008/0197544 A1 | 8/2008 | Saijo et al. | |
| 2008/0211127 A1 | 9/2008 | Naruse et al. | |
| 2008/0213485 A1 | 9/2008 | Shibata | |
| 2008/0236115 A1 | 10/2008 | Sakashita | |

(Continued)

FOREIGN PATENT DOCUMENTS

CN    1717271    1/2006

(Continued)

*Primary Examiner*—Michael A Marcheschi
*Assistant Examiner*—Robert A Clemente
(74) *Attorney, Agent, or Firm*—Ditthavong Mori & Steiner, P.C.

(57) ABSTRACT

A honeycomb structure includes a first end face and a second end face substantially parallel to each other, a peripheral face interconnecting the first end face and the second end face, a ceramic block including plural through cells with partition walls inbetween, the cells extending from the first end face to the second end face, and a coating layer forming the peripheral face of the honeycomb structure. The thickness of the coating layer at the second end face is greater than at the first end face.

30 Claims, 11 Drawing Sheets

U.S. PATENT DOCUMENTS

| | | |
|---|---|---|
| 2008/0236724 A1 | 10/2008 | Higuchi |
| 2008/0237942 A1 | 10/2008 | Takamatsu |
| 2008/0241015 A1 | 10/2008 | Kudo et al. |
| 2008/0284067 A1 | 11/2008 | Naruse et al. |
| 2008/0305259 A1 | 12/2008 | Saijo |
| 2008/0318001 A1 | 12/2008 | Sakakibara |
| 2009/0004431 A1 | 1/2009 | Ninomiya |
| 2009/0107879 A1 | 4/2009 | Otsuka et al. |
| 2009/0130378 A1 | 5/2009 | Imaeda et al. |

FOREIGN PATENT DOCUMENTS

| | | |
|---|---|---|
| DE | 2312794 | 9/1974 |
| EP | 0283224 | 9/1988 |
| EP | 0360591 | 3/1990 |
| EP | 1342888 | 9/2003 |
| EP | 1491257 | 12/2004 |
| JP | 06-170241 | 6/1994 |
| JP | 2002-106337 | 4/2002 |
| JP | 2005-125182 | 5/2005 |
| JP | 2007-014886 | 1/2007 |
| KR | 2006-21912 | 3/2006 |

* cited by examiner

HONEYCOMB STRUCTURE AND EXHAUST GAS TREATMENT DEVICE

CROSS-REFERENCE TO RELATED APPLICATIONS

The present application claims priority under 35 U.S.C. §119 to PCT/JP2007/052340 filed on Feb. 9, 2007. The contents of this application are incorporated herein by reference in their entirety.

BACKGROUND OF THE INVENTION

1. Field of the Invention

The present invention relates to a honeycomb structure and an exhaust gas treatment device having a honeycomb structure.

2. Discussion of the Background

A variety of exhaust gas treatment devices for combustion engines of vehicles, construction machines, and the like have been proposed and put into practical use. In a common exhaust gas treatment device, a casing made of metal or the like is provided halfway along an exhaust pipe, which is connected to an exhaust gas manifold of an engine. In the casing is disposed a honeycomb structure. The honeycomb structure serves as a filter (DPF: Diesel Particulate Filter) for trapping and purifying particulates in exhaust gas, or serves as a catalyst carrier for carrying a catalyst for converting harmful gas components and the like in exhaust gas through catalytic reaction.

For instance, in the case where the honeycomb structure is used as a DPF, the honeycomb structure is provided with plural longitudinally extending pillar-shaped cells with porous cell walls inbetween. One of the ends of each cell is sealed by a sealing member such that the exhaust gas that has entered the honeycomb structure from one cell with one end sealed always passes through the cell wall to another cell with the opposing end sealed to be discharged from the honeycomb structure. It is therefore possible to trap particulates in the exhaust gas at the time the exhaust gas passes through the cell wall. On the other hand, in the case where the honeycomb structure is used as a catalyst carrier, a catalyst carrier layer and a catalyst are disposed on the longitudinal surface of the cell walls of the honeycomb structure such that the catalyst converts harmful gas components in the exhaust gas, such as CO, HC and NOx. When in use, the honeycomb structure is generally mounted, with a holding/sealing member such as a mat wound on the outer surface thereof, in a casing made of metal or the like.

A main component of the honeycomb structure is a ceramic block, which is manufactured through high-temperature firing. However, the outside dimensions of the ceramic block immediately after firing are not so controllable, and therefore a coating layer for dimension adjustment is usually provided in the peripheral part of the ceramic block. Japanese Examined Patent Publication No. 7-14485 discloses, for example, a technique for improving circularity and cylindricity of a resulting honeycomb structure by adjusting the thickness of a coating layer along the length of a ceramic block.

The contents of Japanese Examined Patent Publication No. 7-14485 are incorporated by reference in their entirety.

SUMMARY OF THE INVENTION

According to an aspect of the present invention, a honeycomb structure includes a first end face and a second end face substantially parallel to each other; a peripheral face interconnecting the first end face and the second end face; a ceramic block including plural through cells with partition walls inbetween, the cells extending from the first end face to the second end face; and a coating layer forming the peripheral face of the honeycomb structure. The thickness of the coating layer at the second end face is greater than at the first end face.

In this aspect of the present invention, the coating layer may include a portion where the thickness monotonically increases from the first end face toward the second end face, or may include both a portion where the thickness monotonically increases from the first end face toward the second end face and a portion where the thickness is substantially uniform. Alternatively, the thickness of the coating layer may linearly increase from the first end face toward the second end face.

In this aspect of the present invention, the cross-sectional area of the honeycomb structure parallel to the first end face may be generally substantially uniform from the first end face to the second end face. Alternatively, the cross-sectional area of the honeycomb structure parallel to the first end face may increase from the first end face toward the second end face.

In this aspect of the present invention, at least some of the plural through cells may each have a cross-sectional area parallel to the first end face that increases from the first end face toward the second end face.

In this aspect of the present invention, both the first and second end faces may be circular.

In this aspect of the present invention, the through cells may have at least two shapes when viewed from the first end face.

In this aspect of the present invention, either end of each of the through cells may be sealed. Alternatively, a catalyst may be deposited in the partition wall.

In this aspect of the present invention, the partition wall preferably has a thickness in a range of about 0.1 mm through about 0.6 mm, more preferably in a range of about 0.1 mm through about 0.3 mm.

The ceramic block may be an integrated type ceramic block manufactured by integral molding.

In this aspect of the present invention, the ceramic block may include plural pillar ceramic units and adhesive layers bonding the pillar ceramic units to each other.

The ceramic block may preferably be made of cordierite or aluminum titanate.

The ceramic units may preferably be made of silicon carbide-based ceramic.

According to another aspect of the present invention, an exhaust gas treatment device includes an inlet portion and an outlet portion for exhaust gas; and the above-described honeycomb structure positioned between the inlet portion and the outlet portion. The first end face of the honeycomb structure faces the inlet portion for exhaust gas.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

In one embodiment of the present invention, a honeycomb structure includes a first end face and a second end face substantially parallel to each other; a peripheral face interconnecting the first end face and the second end face; a ceramic block including plural through cells with partition walls inbetween, the cells extending from the first end face to the second end face; and a coating layer forming the peripheral face of the honeycomb structure, wherein the thickness of the coating layer at the second end face is greater than at the first end face.

In one embodiment of the present invention, an exhaust gas treatment device includes an inlet portion and an outlet portion for exhaust gas; and the above-described honeycomb structure positioned between the inlet portion and the outlet portion, wherein the first end face of the honeycomb structure faces the inlet portion for exhaust gas.

It is known that heat (thermal stress) applied to a honeycomb structure during use is not uniform in the longitudinal direction thereof. For instance, in the case where the honeycomb structure is used as a DPF for exhaust gas, the temperature of the honeycomb structure at the outlet side tends to increase due to heat of the exhaust gas. Especially, during a regeneration process for removing particulates (a recovery process for making the filter reusable) trapped in a honeycomb structure used as a filter, the temperature of the honeycomb structure at the exhaust gas outlet side tends to significantly increase. Therefore, if the peripheral part (i.e. the coating layer) of the honeycomb structure does not have sufficient strength, the risk of cracking in this part and damaging the honeycomb structure due to thermal stress is extremely high. Likewise, in the case where the honeycomb structure is used as a catalyst carrier, the temperature of the honeycomb structure at the outlet side tends to increase due to heat resulting from catalytic reaction with HC, etc., in the exhaust gas, and therefore the same problem occurs. There is therefore a need for a honeycomb structure having sufficient strength even under such a thermal influence.

According to an embodiment of the present invention, it is possible to make a honeycomb structure not easily damaged even if used under high temperature conditions.

Preferred embodiments of the present invention are described below with reference to the accompanying drawings. In the following, embodiments of the present invention are described with an example of a honeycomb structure used as a diesel particulate filter (DPF) for trapping particulates in the exhaust gas. However, it should be apparent to those skilled in the art that a honeycomb structure of an embodiment of the present invention is also applicable as a catalyst carrier as described below.

Figure 1:
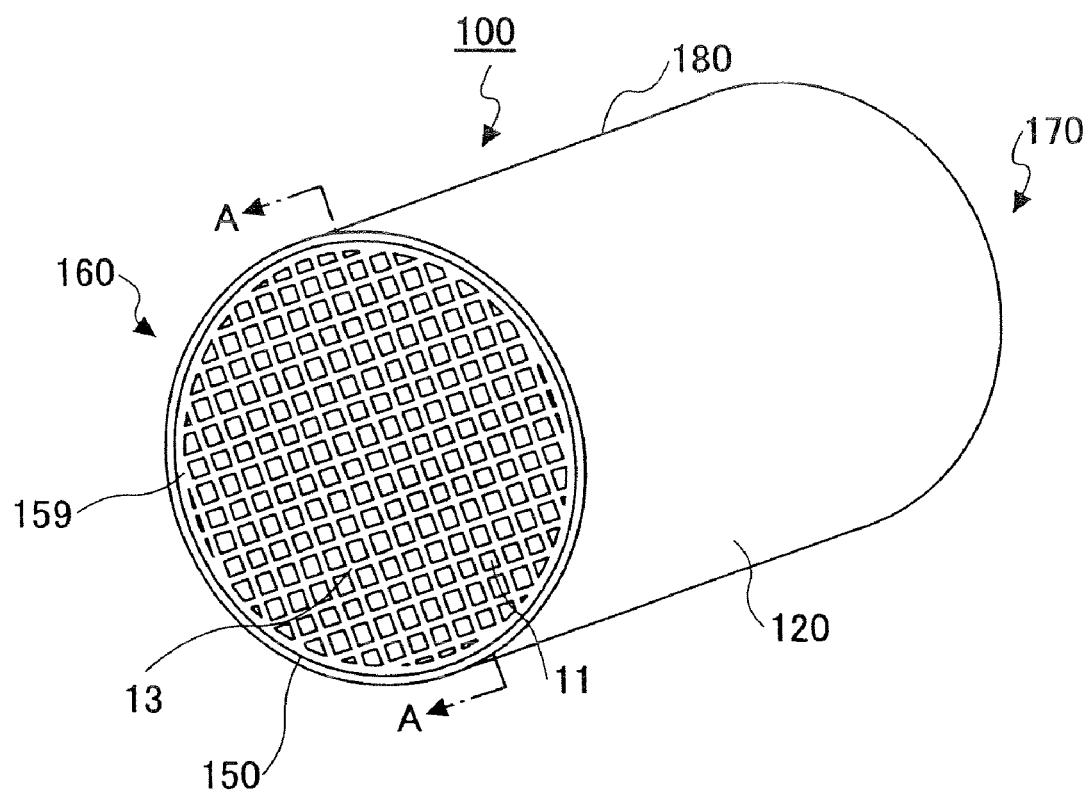
FIG. 1 is a perspective view schematically showing an integrated type honeycomb structure according to an embodiment of the present invention.
Figure 2:
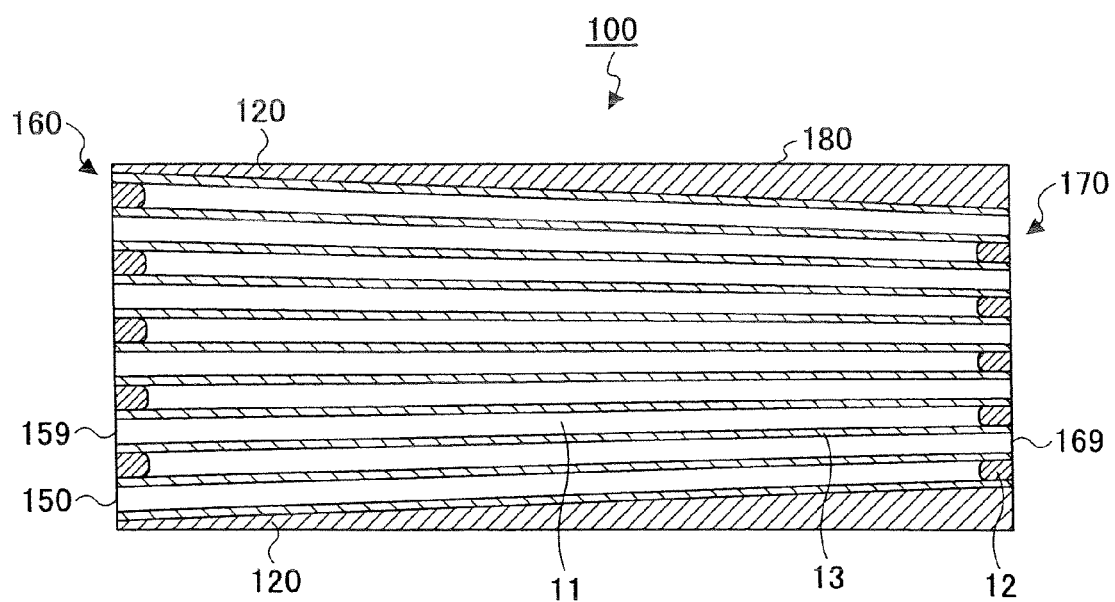
FIG. 2 is a cross-sectional view showing the honeycomb structure taken along line A-A of FIG. 1.
Figure 2:
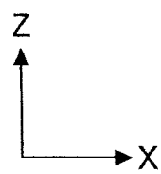

FIG. 1 schematically illustrates a honeycomb structure 100 according to an embodiment of the present invention. FIG. 2 is a cross-sectional view showing the honeycomb structure 100 taken along line A-A of FIG. 1.

As shown in FIG. 1, the honeycomb structure 100 of this embodiment of the present invention includes two end faces (hereinafter referred to as a first end face 160 and a second end face 170) and a peripheral face 180 interconnecting the first end face 160 and the second end face 170. The honeycomb structure 100 of this embodiment of the present invention further includes an integrated type ceramic block 150 and a coating layer 120 on the outer surface (side surface) of the integrated type ceramic block 150 excluding the opposing end faces (hereinafter referred to as a first end face 159 and a second end face 169) thereof. That is, the coating layer 120 forms the peripheral face 180 of the honeycomb structure 100. The first end face 159 of the integrated type ceramic block 150 and an end face of the coating layer 120 at this side form the first end face 160 of the honeycomb structure 100. Similarly, the second end face 169 of the integrated type ceramic block 150 and an end face of the coating layer 120 at this side form the second end face 170 of the honeycomb structure 100.

As shown in the embodiment of FIGS. 1 and 2, in the integrated type ceramic block 150 are formed a number of cells 11 extending from the first end face 159 toward the second end face 169. Cell walls 13 dividing the cells 11 from each other serve as filters. One of a first-end-face-159 end and a second-end-face-169 end of each cell 11 of the integrated type ceramic block 150 is sealed by a sealing member 12. Therefore, the exhaust gas that has flowed into one cell 11 sealed at an end passes through the cell wall 13 to be discharged from another cell 11 sealed at the other end.

According to an embodiment of the present invention, one of the ends of each cell 11 is sealed by the sealing member 12 and not by the coating layer 120. In other words, the ends of the cells 11 are defined by the first and second faces 159 and 169 of the integrated type ceramic block 150 and are not defined by the coating layer 120.

This embodiment of the present invention is characterized in that the thickness of the coating layer 120 forming the peripheral face 180 of the honeycomb structure 100 is greater at the second end face 170 than that at the first end face 160.

For example, in the example shown in FIGS. 1 and 2, the thickness of the coating layer 120 linearly increases from about 0.2 mm at the first end face 160 to about 1.0 mm at the second end face 170. As shown in FIG. 2, in the honeycomb structure 100 of this embodiment, the maximum width (the maximum diameter in FIG. 2) of the plane of the integrated type ceramic block 150 parallel to the first end face 159 (i.e. the plane orthogonal to the x-axis) linearly decreases from the first end face 159 toward the second end face 169. This variation in the maximum width is compensated for by the variation in the thickness of the coating layer 120 such that the contour of the peripheral face 18 of the honeycomb structure 100 is parallel to the longitudinal direction of the honeycomb structure 100 (the x-axis in FIG. 2). In order to provide the integrated type ceramic block 150 with such a shape, each cell 11 is formed such that its cross-sectional area perpendicular to the x-axis decreases from the first end face 159 toward the second end face 169 of the integrated type ceramic block 150.

In this honeycomb structure 100, since the coating layer 120 has greater thickness at the second end face 170, heat resistance in this area is improved. The honeycomb structure 100 is mounted in an exhaust gas treatment device in a manner such that the second end face 170 of the honeycomb structure is located at the higher temperature end (usually, the exhaust gas outlet end), thereby improving high temperature properties of the honeycomb structure 100 and thus effectively preventing the honeycomb structure 100 from being damaged during use.

Just for reference, one of the effects of the thickness of the coating layer 120 on the strength of the honeycomb structure 100 is as follows. According to results of measurements performed by the applicant of the present invention, in the case of the honeycomb structure 100 including the coating layer 120 of a uniform thickness and having a cell wall thickness of 0.4 mm, a porosity of 42%, and a cell density of 200 cpsi, the isostatic strength of the honeycomb structure 100 was substantially doubled (from 7.3 MPa to 14.1 MPa) by increasing the thickness of the coating layer 120 from 0.2 mm to 1 mm. The isostatic strength used herein indicates the compression failure load at the time of occurrence of failure due to application of isotropic hydrostatic load onto an exhaust gas treatment body, and is defined in M505-87 in JASO, the automobile standards issued by Society of Automotive Engineers of Japan inc.

The contents of JASO Standard M505-87 are incorporated by reference in their entirety.

Figure 3:
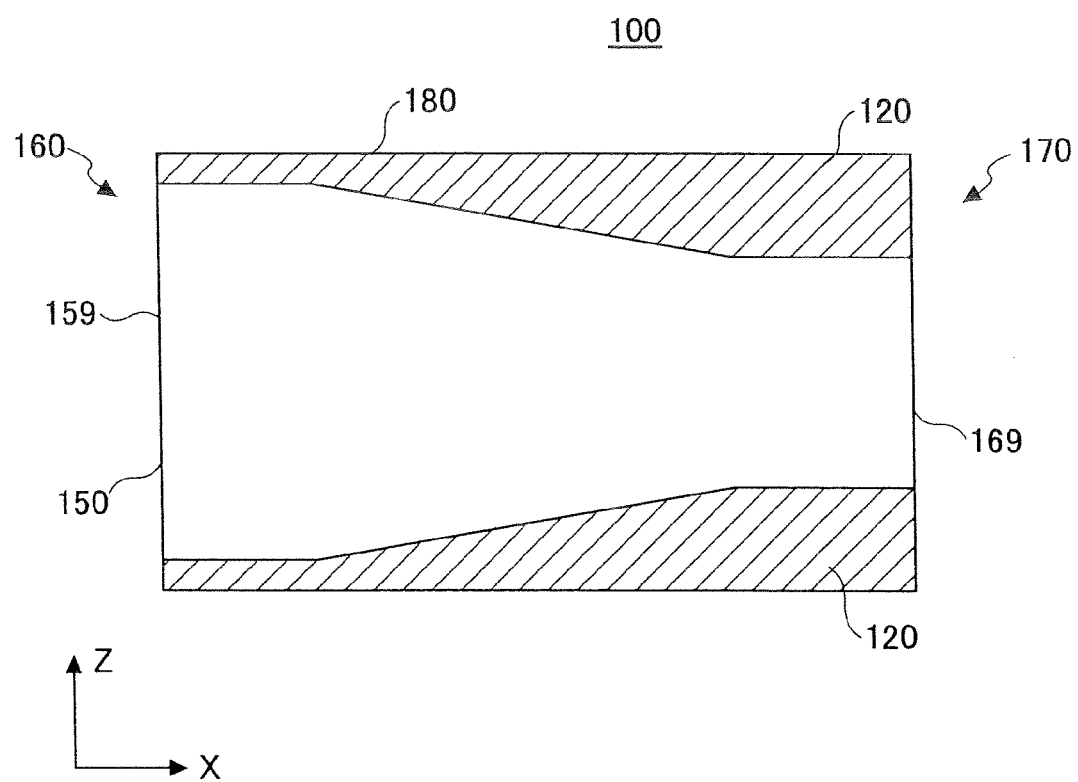
FIG. 3 is a cut-away side view showing another honeycomb structure according to an embodiment of the present invention.
Figure 4:
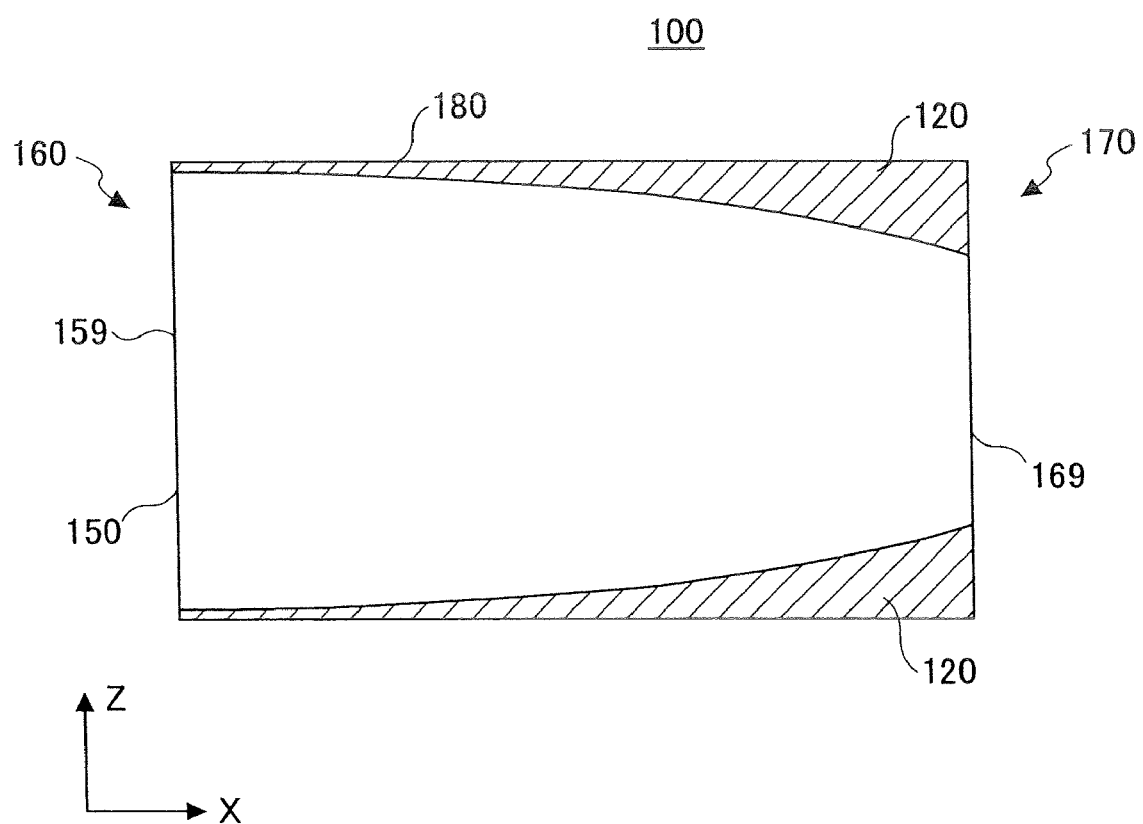
FIG. 4 is a cut-away side view showing still another honeycomb structure according to an embodiment of the present invention.
Figure 5:
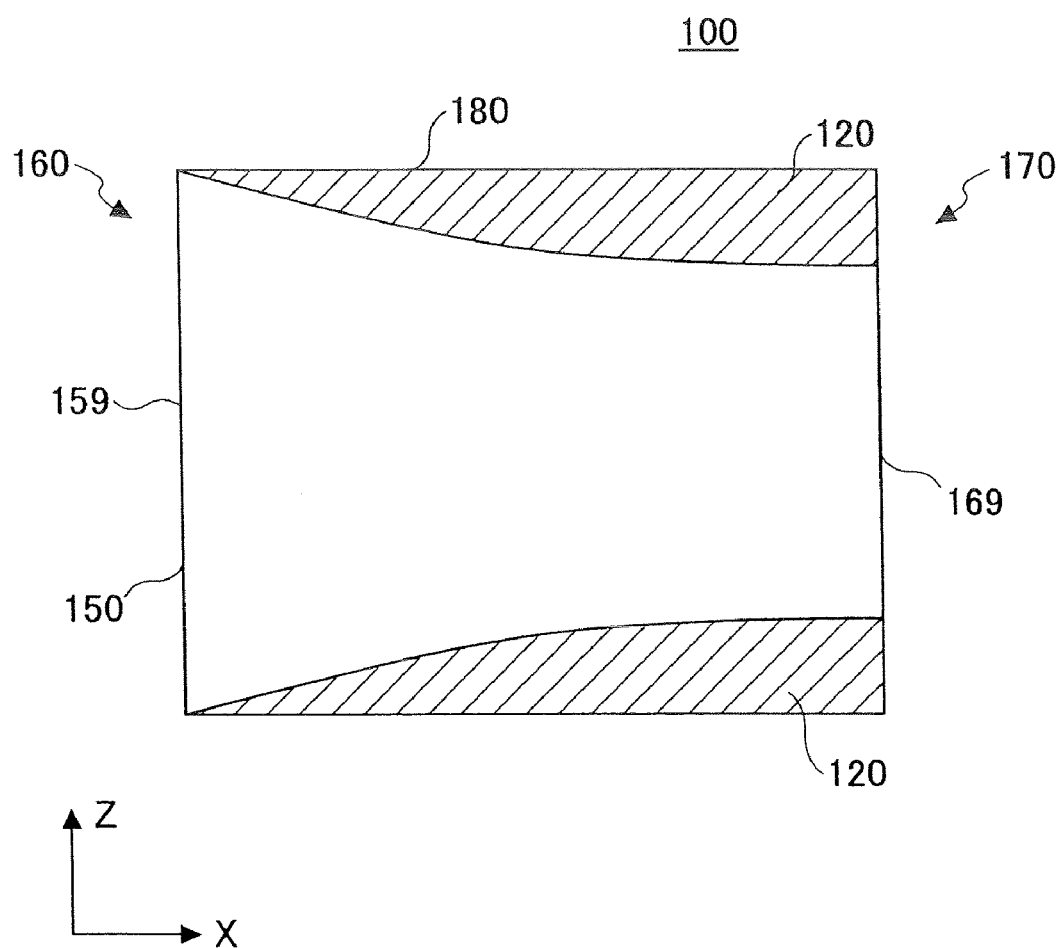
FIG. 5 is a cut-away side view showing a further honeycomb structure according to an embodiment of the present invention.

Although the thickness of the coating layer 120 linearly increases from the first end face 160 toward the second end face 170 of the honeycomb structure 100 in the example shown in the embodiment of FIGS. 1 and 2, the variation of the thickness of the coating layer 120 in the x-axis direction is not so limited. For example, the coating layer 120 may include a portion where the thickness monotonically increases from the first end face 160 toward the second end face 170 and a portion where the thickness is uniform, or may only have a portion where the thickness monotonically increases. For instance, in a honeycomb structure 100 shown in an embodiment of FIG. 3, a coating layer 120 includes both a portion where the thickness monotonically increases from a first end face 160 toward a second end face 170 of the honeycomb structure 100 and portions where the thickness is substantially "uniform". In honeycomb structures 100 shown in an embodiment of FIGS. 4 and 5, a coating layer 120 includes only a portion where the thickness increases nonlinearly and monotonically from a first end face 160 toward a second end face 170.

Although, in the example shown in FIGS. 1 and 2, the cross-sectional area of the honeycomb structure 100 perpendicular to its longitudinal axis (the x-axis) is substantially uniform, the shape of the honeycomb structure 100 is not limited thereto. For example, the cross-sectional area of the honeycomb structure 100 perpendicular to its longitudinal axis may increase or decrease from the first end face 160 toward the second end face 170. If a coating layer 120 whose thickness increases monotonically from the first end face 159 toward the second end face 169 is provided on the integrated type ceramic block 150 whose cross-sectional area perpendicular to the longitudinal axis is uniform, the cross-sectional area of the honeycomb structure 100 perpendicular to the longitudinal axis increases monotonically from the first end face 160 toward the second end face 170.

That is, in an embodiment of the present invention, the coating layer 120 has thickness greater at the second end face 170 of the honeycomb structure 100 than toward the first end face 160, and as long as the honeycomb structure 100 has this characteristic, the shape of the honeycomb structure 100 and/or the shape of the integrated type ceramic block 150 is not so important. It is to be noted that, in FIGS. 3 through 5, the coating layer 120 is indicated by hatching in order to clearly show the boundary between the coating layer 120 and the integrated type ceramic block 150.

The honeycomb structure 100 of this embodiment of the present invention is applicable to an exhaust gas treatment device of a vehicle, for example.

Figure 6:
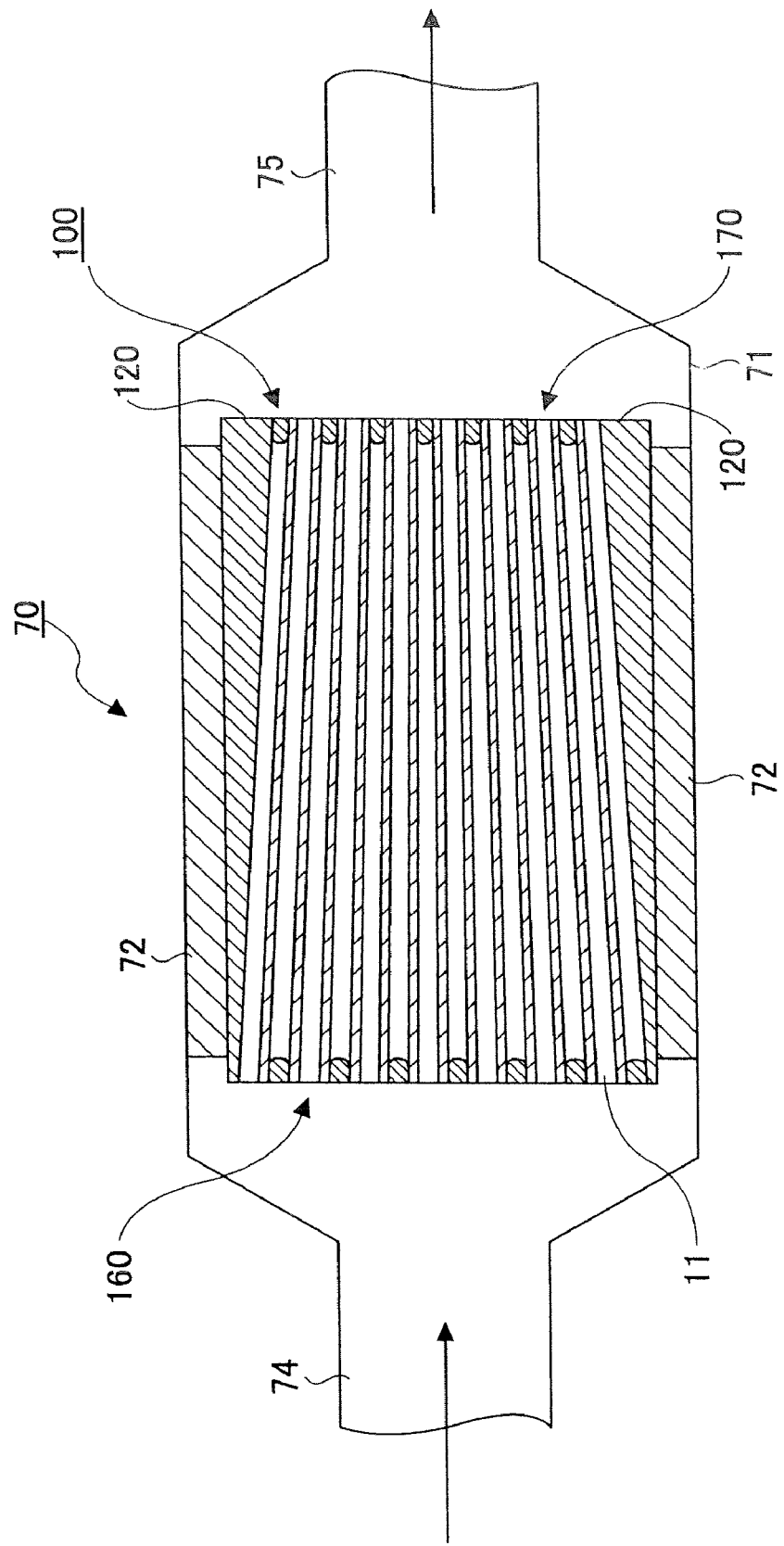
FIG. 6 is a cut-away side view schematically showing an exhaust gas treatment device with a honeycomb structure mounted therein according to an embodiment of the present invention.

FIG. 6 schematically shows an exhaust gas treatment device 70 in which a honeycomb structure 100 of an embodiment of the present invention is mounted. The honeycomb structure 100 of FIG. 6 includes cells 11 each having one end sealed, and is used as a DPF.

As shown in the embodiment of FIG. 6, the exhaust gas treatment device 70 generally includes the honeycomb structure 100, a metal casing 71 in which the honeycomb structure 100 is disposed, and a holding/sealing member 72 disposed between the honeycomb structure 100 and the casing 71 and configured to hold the honeycomb structure 100 in an appropriate position. The exhaust gas treatment device 70 has an end (inlet portion) connected to an inlet pipe 74 for receiving the exhaust gas discharged from an internal combustion engine, and the other end (exhaust portion) connected to an exhaust pipe 75 for discharging the exhaust gas. The arrows in FIG. 6 indicate the flow of the exhaust gas.

In this embodiment of the present invention, the honeycomb structure 100 is disposed in the casing 71 to have the first end face 160 at the exhaust gas inlet side. Therefore, the exhaust gas discharged from an internal combustion engine passes through the inlet pipe 74 to enter the casing 71, and flows into the honeycomb structure 100 from the cells 11 having open ends at the first end face 160 of the honeycomb structure 100. The exhaust gas that has flowed into the honeycomb structure 100 passes through the cell walls 13, which traps particulates and thereby purifies the exhaust gas. Then, the exhaust gas passes through the cells 11 having open ends at the second end face 170 of the honeycomb structure 100, is discharged from the exhaust gas treatment device 70, and eventually is discharged to the outside through the exhaust pipe 75. In the case where the honeycomb structure 100 is used as a catalyst carrier, harmful components in exhaust gas such as CO, HC, NOx, etc. are cleaned while the exhaust gas passes through the cell walls 13, so that the exhaust gas is converted.

In the exhaust gas treatment device 70 of this embodiment of the present invention, the thickness of a coating layer 120 is greater toward the exhaust gas outlet end with higher temperature, i.e., the second end face 170 of the honeycomb structure 100. Therefore, the honeycomb structure 100 has higher strength toward the second end face 170 than a conventional honeycomb structure having a coating layer 120 of uniform thickness, and is not easily damaged even if the temperature increases in the vicinity of the second end face 170.

Figure 7:
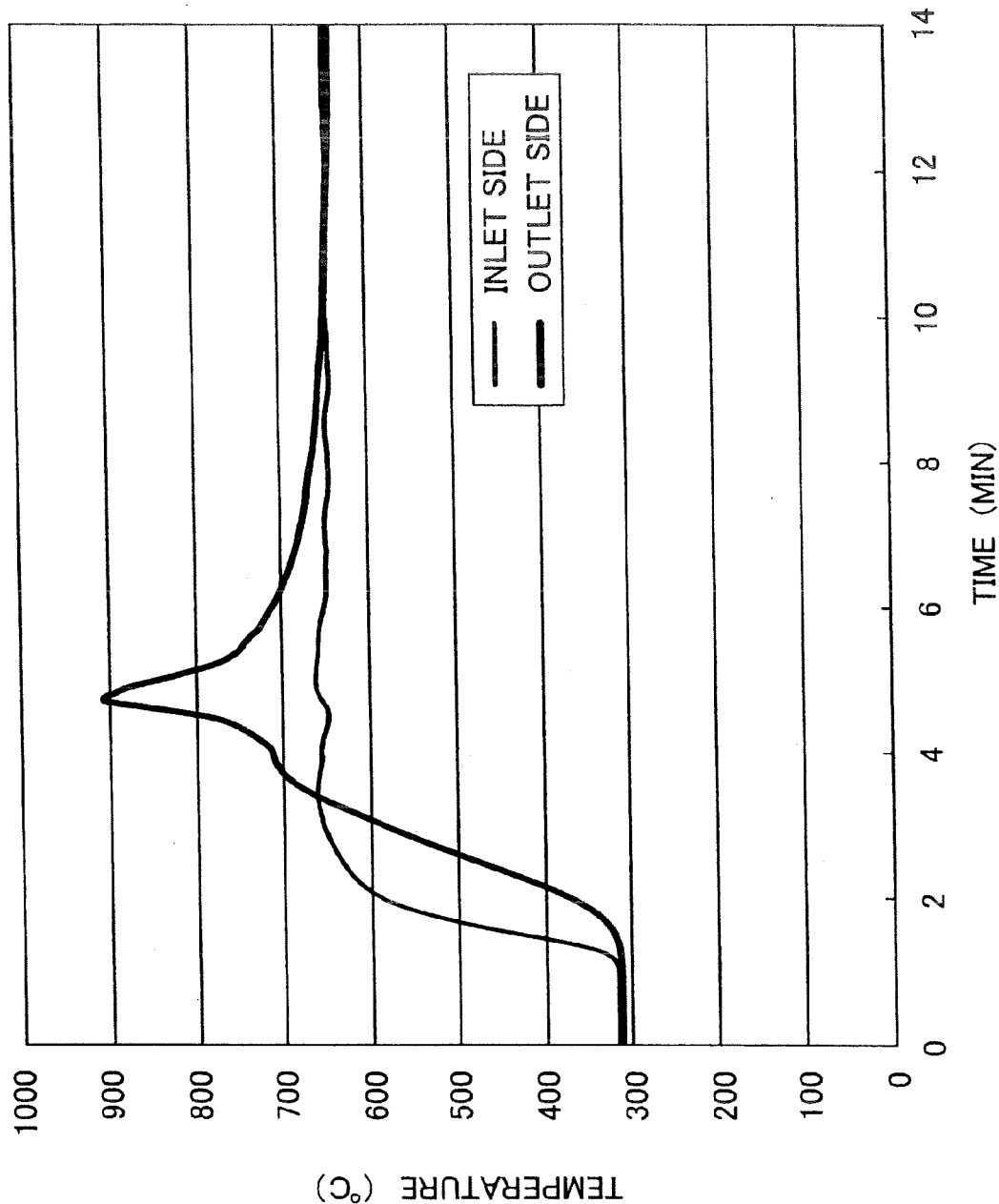
FIG. 7 is a graph showing temperature changes at the inlet side and the outlet side of a common honeycomb structure during a regeneration process.

FIG. 7 shows temperature variations in a common honeycomb structure (i.e. a honeycomb structure having a coating layer having uniform thickness along its length) of an exhaust gas treatment device during a regeneration process of the exhaust gas treatment device. In the table shown in FIG. 7, the curve shown with a thin line indicates the temperature variation at the inlet side of the honeycomb structure (in the substantial center on the plane longitudinally 13 mm inward from the inlet end face), and the curve shown with a thick line indicates the temperature variation at the outlet side of the honeycomb structure (in the substantial center on the plane longitudinally 13 mm inward from the outlet end face). As shown in FIG. 7, during the regeneration process of the honeycomb structure, the temperature at the outlet side of the honeycomb structure often becomes extremely high to exceed 900° C. Even during such a regeneration process, the honeycomb structure 100 of an embodiment of the present invention is not easily damaged.

In the above, characteristics of the embodiments of the present invention are described based on the honeycomb structure 100 that includes the integrated type ceramic block 150 manufactured by integral molding. However, an embodiment of the present invention is also applicable to a honeycomb structure that includes a ceramic block 250, which includes plural porous honeycomb units 230 bonded to one another by interposing adhesive layers 210 including adhesive agent or the like.

Figure 8:
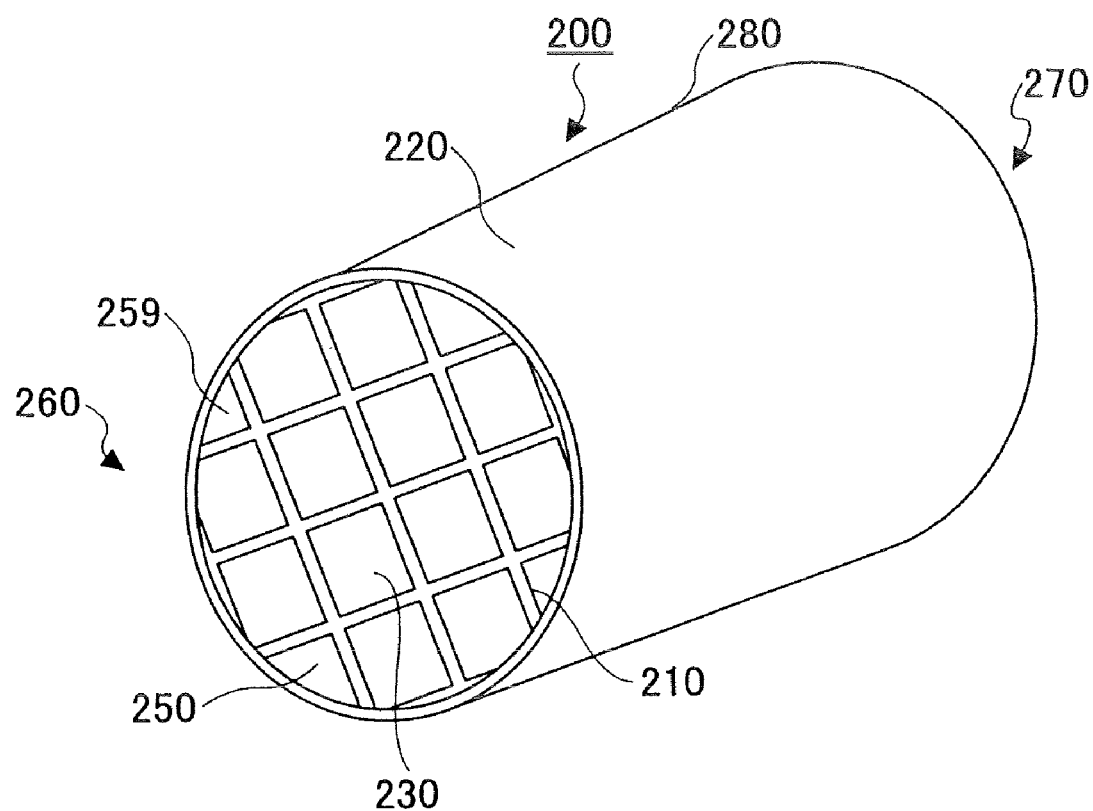
FIG. 8 is a perspective view schematically showing a bonded type honeycomb structure according to an embodiment of the present invention.
Figure 9:
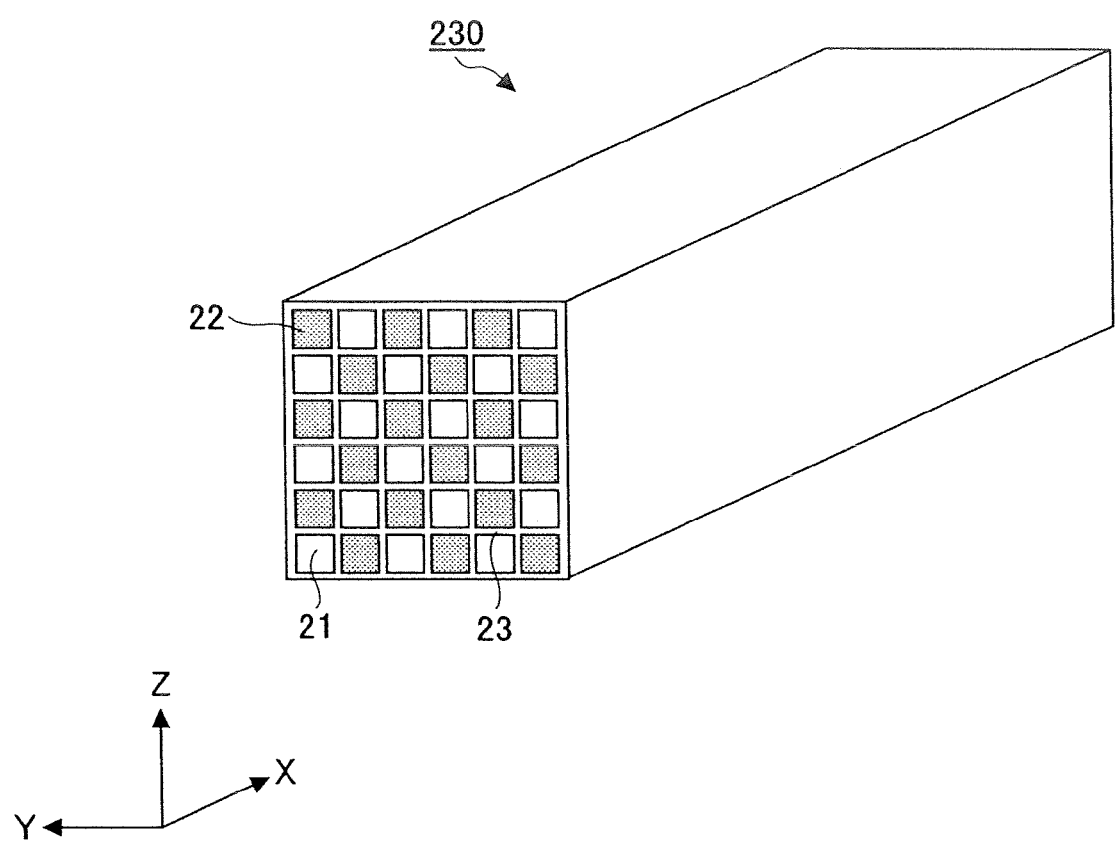
FIG. 9 is a perspective view schematically showing a porous honeycomb unit of a bonded type honeycomb structure according to an embodiment of the present invention.

FIG. 8 shows an example of an embodiment of a honeycomb structure having such a configuration. FIG. 9 shows an example of a porous honeycomb unit of a ceramic block. In the following, the honeycomb structure 100 shown in FIGS. 1 and 2 is referred to as "an integrated type honeycomb structure", while a honeycomb structure including plural porous honeycomb units 230 that are bonded to one another by interposing the adhesive layer 210 as shown in FIG. 8 is referred to as "a bonded type honeycomb structure".

As shown in the embodiment of FIG. 8, a honeycomb structure 200 includes substantially parallel first and second end faces 260 and 270, and a peripheral face 280 interconnecting the first end face 260 and the second end face 270. The bonded type honeycomb structure 200 further includes the ceramic block 250 and a coating layer 220 on the side surface of the ceramic block 250.

The coating layer 220 is disposed on the surface of the ceramic block 250 excluding the opposing end faces thereof, and forms the peripheral face 280 of the bonded type honeycomb structure 200. The thickness of the coating layer 220 is greater toward the second end face 270 than at the first end face 260 of the bonded type honeycomb structure 200.

The ceramic block 250 includes a first end face 259 and a second end face in the positions corresponding to the first end face 260 and the second end face 270 of the honeycomb structure 200, respectively. The ceramic block 250 is formed as follows, for example: plural porous honeycomb units 230 of square-pillar shapes (4 by 4 array, a total of 16 honeycomb units 230 in the example of FIG. 8) are bonded to each other by interposing the adhesive layers 210 as shown in FIG. 9; and the bonded porous units 230 are made to have a predetermined outer shape through a machining process such as cutting or polishing. As shown in FIG. 9, each porous honeycomb unit 230 includes a number of cells 21 aligned along the center axis (the X-axis). The walls dividing the cells 21 serve as filters. Similar to the integrated type ceramic block 150, opposite ends of adjacent cells 21 are sealed by a sealing member 22.

In the example shown in the embodiment of FIGS. 8 and 9, each porous honeycomb unit 230 of the ceramic block 250 has a side face parallel to the longitudinal direction (the x-axis of FIG. 9). The coating layer 220 has a thickness that monotonically increases from the first end face of the ceramic block 250 toward the second end face. Accordingly, the finished bonded type honeycomb structure 200 has an outer shape such that the cross-sectional area perpendicular to the x-axis monotonically increases from the first end face 260 toward the second end face 270.

However, the outer shape of the bonded type honeycomb structure 200 is not limited thereto. For instance, the bonded type honeycomb structure 200 may have a peripheral face 280 with a contour parallel to the longitudinal direction. In this case, the side face of the ceramic block 250 needs to be formed to compensate for the thickness variation of the coating layer 220. Such a ceramic block can be formed by joining plural porous honeycomb units each having a cross-sectional area perpendicular to the longitudinal direction that decreases from one end to the other end.

The integrated type ceramic block 150 and the porous honeycomb units 230 of the ceramic block 250 (hereinafter collectively referred to as ceramic components) may be formed of, for example, nitride ceramic such as aluminum nitride, silicon nitride, boron nitride, and titanium nitride; carbide ceramic such as silicon carbide, zirconium carbide, titanium carbide, tantalum carbide, and tungsten carbide; and oxide ceramic such as alumina, zirconia, cordierite, mullite, silica, and aluminum titanate. The "ceramic components" may be made of a composite material of two or more materials, such as a composite material of metal silicon and silicon carbide. The proportion of the metal silicon is preferably in a range of 0 to 45 wt % with respect to the total weight of the composite material of metal silicon and silicon carbide.

In the case of the porous honeycomb units, among these ceramic materials, silicon carbide-based ceramic is preferable due to high heat resistance, good mechanical strength and high thermal conductivity. The silicon carbide-based ceramic as used herein indicates a material that contains about 60 wt % of silicon carbide or more (A composite material of metal silicon and silicon carbide is also included). In the case of the integrated type ceramic block, cordierite and aluminum titanate are preferable choices due to their high resistant to thermal shock and low thermal expansion coefficients.

The cell walls 13, 23, and the corresponding sealing members 12, 22 of the "ceramic components" are preferably made of the substantially same material and have the substantially same porosity. This improves adhesion between the cell walls 13, 23, and the corresponding sealing members 12, 22 and makes the cell walls 13, 23, and the corresponding sealing members 12, 22 easily have matched thermal expansion coefficients. Thus it becomes possible to easily prevent a crack and a gap being produced between the sealing members 12, 22 and the cell walls 13, 23 due to stress during manufacture and during use.

The lengths of the sealing members 12 and 22 may preferably be in, but are not particularly limited to, a range of 1 to 20 mm, and more preferably be in arrange of 3 to 10 mm.

The thicknesses of the cell walls (partition walls) 13 and 23 may preferably be, but not particularly limited to, about 0.1 at a minimum in terms of strength, and be about 0.6 mm at a maximum in terms of pressure loss. Because the thinner the cell walls the lower the strength, the effect according to the embodiment of the present invention is more pronounced when the thickness of the cell walls 13 and 23 is in a range of from about 0.1 to about 0.3 mm. The cell walls 13 and 23 (partition wall) do not need to have uniform thicknesses along the cell longitudinal direction. For example, in the case of an integrated type ceramic block 150 having a side shape as shown in FIG. 2, the thickness of at least a part (especially a part near the outer periphery) of a cell wall 13 may gradually decrease from a first end face 160 toward a second end face 170, unlike the cell wall 13 shown in FIG. 2. Similarly, in the case of a porous honeycomb unit having a side shape such that the cross-sectional area perpendicular to the longitudinal direction decreases from one end face toward the other end face, the thickness of at least a part (especially a part near the outer periphery) of a cell wall 23 may gradually decrease from one end toward the other end.

The coating layers 120 and 220 of the honeycomb structures 100 and 200 of the embodiments of the present invention may be made of any material. For example, inorganic binder, organic binder, inorganic fiber and/or inorganic particles may be used.

Examples of inorganic binder may include silica sol, alumina and the like, which may be used alone or as a mixture of two or more of these. Among these inorganic binders, silica sol is more preferable.

Examples of organic binder may include polyvinyl alcohol, methyl cellulose, ethylcellulose, carboxymethylcellulose and the like, which may be used alone or as a mixture of two or more of these. Among these organic binders, carboxymethylcellulose is more preferable.

Examples of inorganic fiber may include ceramic fiber such as silica-alumina, mullite, and silica, which may be used alone or as a mixture of two or more of these. Among these inorganic fibers, silica-alumina fiber is more preferable.

Examples of inorganic particle include carbide, nitride and the like, more specifically, inorganic powder or whiskers made of silicon carbide, silicon nitride, arsenic nitride and the like. These materials may be used alone or as a mixture of two or more of these. Among these inorganic particles, silicon carbide is more preferable due to its high thermal conductivity.

Usually, the coating layer 220 is formed by preparing a paste containing the above-described components, depositing the paste in a predetermined area, and drying it. If necessary, a pore-producing agent may be added to the paste as a raw material. Examples of pore-producing agents may include balloons, which are hollow microspheres of oxide ceramic, spherical acrylic particles, graphite and the like.

The adhesive layers 210 of the honeycomb structure 200 of this embodiment of the present invention may be made of the same material as the coating layer 220.

The cross sections of the honeycomb structures 100 and 200 of the embodiments of the present invention parallel to the first end faces 160 and 260 (or the second end faces 170 and 270), respectively, may have any shape including, e.g., a circular shape as shown in FIGS. 1 and 8, an elliptical shape, and a chamfered or non-chamfered polygonal shape.

The cells 11 and 21 may be in any shape (as viewed from the first end face of the honeycomb structure), and may be, e.g., square, rectangular, triangular, hexagonal, or octagonal. The cells 11 and 21 do not need to have the same shape and may have different shapes from each other.

Figure 10:
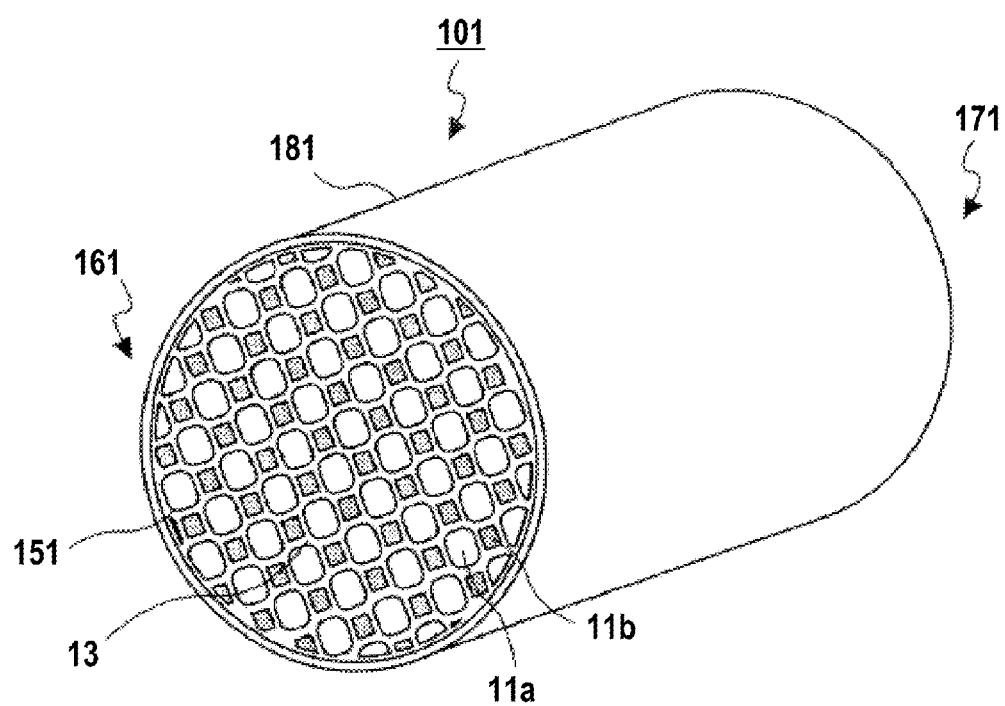
FIG. 10 is a view showing an integrated type honeycomb structure with two kinds of cross-sectional cell shapes.
Figure 11:
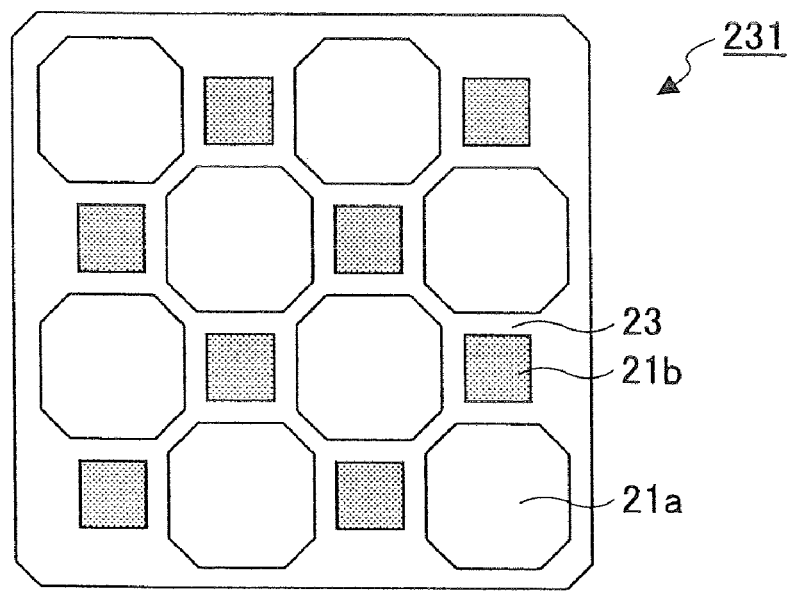
FIG. 11 illustrates a honeycomb structure with two kinds of cross-sectional cell shapes as viewed from an end face.
Figure 12:
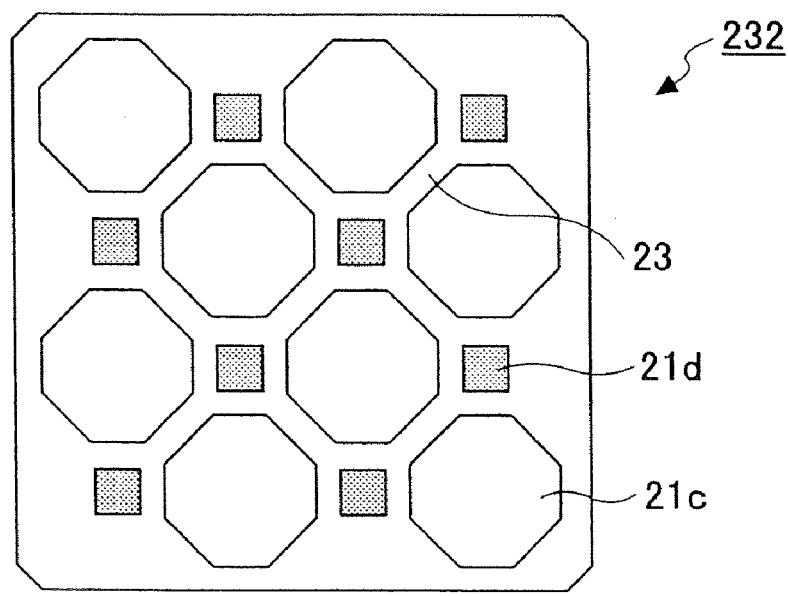
FIG. 12 illustrates another honeycomb structure with two kinds of cross-sectional cell shapes as viewed from an end face.

FIG. 10 shows an embodiment of an integrated type honeycomb structure 101 including a first and face 161, a second end face 171, and a peripheral face 181. The honeycomb structure 101 of FIG. 10 is different from the honeycomb structure 100 of FIG. 1. FIGS. 11 and 12 show embodiments of porous honeycomb units 231 and 232 for bonded type honeycomb structures as viewed from end faces. The honeycomb units of FIGS. 11 and 12 are different from the porous honeycomb unit 230 of FIG. 9. Referring to FIG. 10, an integrated type ceramic block 151 includes two kinds of cells 11a and 11b, i.e., cells 11a with octagonal cross-sectional shapes and cells 11b of quadrangular shapes. The quadrangular cells 11b are sealed at the first end face 161 of the honeycomb structure 101, and the octagonal cells 11a are sealed at the second end face 171 of the honeycomb structure 101. Similarly, the porous honeycomb unit 231 of FIG. 11 includes cells 21a of octagonal cross-sectional shapes and cells 21b of quadrangular cross-sectional shapes. The porous honeycomb unit 232 of FIG. 12 includes cells 21c of octagonal cross-sectional shapes and cells 21d of quadrangular cross-sectional shapes, which are different from those of FIG. 11. With these cell configurations and layouts, when viewed as a cross section perpendicular to the axis direction, the volume of the walls tends to be relatively reduced compared with a honeycomb structure (e.g. those shown in FIGS. 1 and 8) in which all the cells have the same cross-sectional dimensions. Accordingly, the strength of the honeycomb structure tends to be reduced especially toward the second end face. However, according to an embodiment of the present invention, even if the honeycomb structure has such a configuration, it is possible to prevent the outlet side of the honeycomb structure from being damaged during use due to the above-mentioned effects of the coating layer.

(Method of Manufacturing Integrated Type Honeycomb Structure)

The following describes a method of manufacturing the integrated type honeycomb structure 100 of the embodiment shown in FIGS. 1 and 2.

First, extrusion molding is performed using raw material paste made mainly of the above-mentioned ceramic particles so as to form an integrated type ceramic block molded body. Next, the molded body is dried with use of a microwave dryer, a hot air dryer, a dielectric dryer, a low-pressure dryer, a vacuum dryer, a freezing dryer, or the like.

In order to make an integrated type ceramic block having a side face with cross-sectional area perpendicular to the longitudinal direction that decreases from the first end face toward the second end face, either one of the following methods is preferably used for forming the molded body.

1) Gradually reduce or increase the speed of extruding the molded body during molding. The cross-sectional area perpendicular to the longitudinal direction is reduced by increasing the molding speed. On the other hand, the cross-sectional area perpendicular to the longitudinal direction is increased by reducing the molding speed.

2) Change the speed of drying the molded body in the longitudinal direction during the drying process. The portion of the molded body dried quicker with higher drying speed has greater shrinkage rate and has smaller cross-sectional area perpendicular to the longitudinal direction. This difference of the shrink properties is utilized to produce a variation of the cross-sectional area perpendicular to the longitudinal direction of the molded body.

The raw material paste may be, but is not limited to, one that makes the prepared integrated type ceramic block have a porosity in a range of from about 40 to about 75%, and may include powders made of the above-mentioned ceramic with binder or dispersion solvent added. Although the diameter of the ceramic powder particles is not particularly limited, it is preferable to mix 100 parts by weight of powder having an average particle diameter of from about 0.3 to about 50 μm and from about 5 to about 65 parts by weight of particles having average particle diameter of from about 0.1 to about 1.0 μm.

The binder used herein may include, but is not limited to, methyl cellulose, carboxymethylcellulose, hydroxyethylcellulose, polyethyleneglycol, etc. The proportion of the binder is preferably in a range of from about 1 to about 10 parts by weight with respect to 100 parts by weight of the ceramic powder.

The dispersion solvent used herein may include, but not limited to, organic solvent such as benzene, alcohol such as methanol, water, etc. The volume of the dispersion agent is adjusted such that the raw material paste has a predetermined range of viscosity.

These ceramic powder, binder, and dispersion solvent are mixed using an attritor or the like, sufficiently kneaded using a kneader or the like, and molded by extrusion molding.

A molding assisting agent may be added to the raw material paste if necessary. Examples of molding assisting agents used herein may include, but are not limited to, ethylene glycol, dextrin, fatty acid, fatty acid soap, polyvinyl alcohol and the like. If necessary, a pore-producing agent may be added to the raw material paste. Examples of pore-producing agents may include balloons, which are hollow microspheres of oxide ceramic, spherical acrylic particles, graphite and the like.

After the drying process, one of the ends of each cell of the dried molded body is filled and sealed with sealing paste.

The sealing paste as used herein may be, but is not limited to, one that becomes a sealing member of from about 30 to about 75% porosity after the subsequent processes, and may be the same one as the above-described raw material paste.

The dried molded body having ends sealed with the sealing paste is subjected to a degreasing process (e.g. at from about 200 to about 500° C.) and a firing process (e.g. at from 1,400 to about 2,300° C.) to obtain an integrated type ceramic block. The conditions of the degreasing process and the firing process used herein may be those used for manufacturing conventional honeycomb structures.

Subsequently, coating paste (which may be the same one as the raw material paste, the same one as the sealing paste, or paste made of other material) is applied onto the peripheral face of the integrated type ceramic block. The applied coating paste is dried and solidified, thereby obtaining a coating layer. In this process, the coating paste is applied such that the integrated type ceramic block after application of the coating paste has a side face substantially parallel to the longitudinal direction.

Thereafter, the coating layer is dried and solidified, so that an integrated type honeycomb structure is fabricated wherein the coating layer has a thickness greater at the second end face than at the first end face.

It should be apparent to those skilled in the art that the above-described manufacturing method is merely an example and other methods may be used to manufacture the integrated type honeycomb structure. For example, the sealing process for sealing the ends of the cells of the integrated type ceramic block and the firing process of the integrated type ceramic block may be performed in reverse order.

(Method of Manufacturing Bonded Type Honeycomb Structure)

A method of manufacturing the bonded type honeycomb structure of the embodiment shown in FIG. 8 is described below.

First, extrusion molding is performed using raw material paste made mainly of the above-mentioned ceramic particles so as to form a ceramic unit molded body having the shape of a square-pillar, for example.

Next, the ceramic unit molded body is dried with use of a microwave dryer, a hot air dryer, a dielectric dryer, a low-pressure dryer, a vacuum dryer, a freezing dryer, or the like. Then, one of the ends of each cell is filled and sealed with a predetermined volume of sealing paste.

The dried ceramic unit molded body having ends sealed with the sealing paste is subjected to a degreasing process (e.g. at from about 200 to about 500° C.) and a firing process (e.g. at from about 1,400 to about 2,300° C.) to obtain a porous honeycomb unit having a square-pillar shape.

Then, adhesive paste, which becomes an adhesive layer in a later step, is applied at uniform thickness onto the side face of the porous honeycomb unit. Thereafter, the porous honeycomb unit is disposed onto another porous honeycomb unit with the coating paste inbetween. This process is repeated until a ceramic block of a desired size (e.g. 4 by 4 arrays of honeycomb units) is formed. The adhesive paste used herein may be the same one as the raw material paste or the sealing paste described above. The ceramic block is then heated so as to dry and solidify the adhesive paste, so that adhesive layers are formed that bond the porous honeycomb units to each other.

Then, the ceramic block is cut into a cylindrical shape using a diamond cutter or the like, and thus a ceramic block is manufactured that has a contour parallel to the axial direction.

Subsequently, coating paste (which may be the same one as the adhesive paste, or paste made of other material) is uniformly applied onto the peripheral face of the ceramic block. The applied coating paste is dried and solidified, thereby obtaining a coating layer.

After being dried and solidified, the coating layer is polished along its length such that the coating layer has a thickness greater at the second end face than at the first end face. According to an alternative method, the coating paste may be applied so as to be thicker at the second end face than at the first end face. Then, the coating paste is dried and solidified, thereby obtaining a coating layer having greater thickness at the second end face. With these steps, the bonded type honeycomb structure of an embodiment of the present invention is manufactured.

In an alternative embodiment, plural porous honeycomb units with different shapes are joined by interposing adhesive paste, thereby obtaining a ceramic block. In this alternative embodiment, the process of cutting the outer periphery may be omitted.

(Method of Manufacturing Catalyst Carrier)

Although the honeycomb structures 100 and 200 are used as DPFs in the above, they may be used as catalyst carriers for converting CO, HC, NOx, etc. contained in exhaust gas. The following is a method of manufacturing a catalyst carrier with use of a honeycomb structure of an embodiment of the present invention.

In the case of using a honeycomb structure of an embodiment of the present invention as a catalyst carrier, the process of sealing the cell ends is replaced with a process of depositing a catalyst of noble metal or the like onto the cell walls.

First, a catalyst carrier layer is deposited on the cell walls. The catalyst carrier layer may include oxide ceramic such as alumina, titania, zirconia, silica, and ceria. As one way of forming an alumina catalyst carrier layer on the cell walls, for example, a honeycomb structure is dipped into a solution containing alumina powder, removed from the solution, and heated. Thereafter, the honeycomb structure may be dipped into a solution of, e.g., $Ce(NO_3)_3$ for impregnation of rare earth elements into the catalyst carrier layer.

Then, a catalyst is deposited in the catalyst carrier layer. Examples of the material of the catalyst include, but are not limited to, noble metals such as platinum, palladium, and rhodium. The catalyst may carry a compound containing alkali earth metal, rare earth metal element, transition metal or the like. As one way of depositing a platinum catalyst, for example, a "ceramic component" having a catalyst carrier layer is dipped into a solution of diamine dinitro platinum nitrate ($[Pt(NH_3)_2(NO_2)_2]HNO_3$) and then heated.

In the case of the integrated type honeycomb structure 100, the catalyst is disposed by taking the above-described steps after the integrated type ceramic block 150 is manufactured. On the other hand, in the case of the bonded type honeycomb structure 200, deposition of the catalyst can be performed at any time after the porous honeycomb unit 230 is manufactured.

The effects of embodiments of the present invention are described in greater detail with reference to specific examples.

Example 1

[Manufacturing of Bonded Type Honeycomb Structure]

First, 40 wt % of γ alumina particles (average particle diameter: 2 μm), 10 wt % of silica-alumina fibers (average fiber diameter: 10 μm; average fiber length: 100 μm; aspect ratio: 10), 50 wt % of silica sol (solid concentration: 30 wt %) were mixed. Then, 6 parts by weight of methylcellulose as an organic binder and small amounts of plasticizer and lubricant were added to 100 parts by weight of the obtained mixture, and were further mixed and kneaded to obtain a mixed composition. Then, this mixed composition was molded by extrusion molding using an extruder to obtain a raw molded body.

The raw molded body was sufficiently dried using a microwave dryer and a hot air dryer, and then degreased at 400° C. for two hours. Thereafter, the molded body was fired at 800° C. for two hours to obtain a honeycomb unit of a square pillar (34.3 mm×34.3 mm×150 mm) having cells of substantially square cross-sectional shapes, a cell density of 93/cm$^2$ (600 cpsi), and a partition wall thickness of 0.2 mm.

Next, sealing paste was prepared by mixing 29 wt % of γ alumina particles (average particle diameter: 2 μm), 7 wt % of silica-alumina fibers (average particle diameter: 10 μm; average fiber length: 100 μm), 34 wt % of silica sol (solid concentration: 30 wt %), 5 wt % of carboxymethylcellulose, and 25 wt % of water. One of the ends of each cell was filled and sealed with a predetermined volume of this sealing paste.

Then, honeycomb units were bonded to each other with adhesive paste having the same composition as the sealing paste. The thickness of the adhesive layers was about 1 mm. In this way, a ceramic block including 4 by 4 arrays of bonded honeycomb units was manufactured.

The ceramic block was cut into a cylindrical shape using a diamond cutter. The first and second end faces of the obtained ceramic block were cylindrical in shape having diameters of about 142.8 mm.

Then, in order to form a coating layer on the peripheral face, the above-mentioned adhesive paste was applied to the side surface (i.e. the cut surface) of the ceramic block. Herein, the adhesive paste was applied such that the thickness thereof gradually increases from the first end face (0.2 mm thickness) toward the second end face (1.0 mm thickness). Then, after two hours of drying at 120° C., the obtained adhesive layer and coating layer were degreased, thereby obtaining a honeycomb structure having the coating layer whose thickness gradually increases from the first end face toward the second end face. The total length of the honeycomb structure was 150 mm.

[Regeneration Test]

A regeneration test was performed on an exhaust gas treatment device including the honeycomb structure manufactured as described above. The honeycomb structure with an inorganic fiber mat (6 mm thickness) wound on the peripheral face was placed in a metal casing (150 mm inner diameter 190 mm length). The honeycomb structure was mounted in the exhaust gas treatment device such that the first end face thereof faces the inlet side of the exhaust gas treatment device.

The regeneration test was carried out in the following manner. The exhaust gas treatment device was placed in the inlet side of an exhaust pipe of an engine (2-liter direct injection engine). First, the engine was operated at a rotational speed of 2,000 rpm and a torque of 100 Nm for 9 hours to have the honeycomb structure trap approximately 18.8 g/L of soot. Then, in order to burn the soot trapped by the honeycomb structure, the engine was switched into a post injection mode and was operated such that the temperature of the honeycomb structure at the inlet would become approximately 600° C. one minute after starting the post injection. The engine was stopped after burning the soot, and then the honeycomb structure was removed from the exhaust gas treatment device to observe damage to the honeycomb structure.

After the test, no damage was observed in the vicinity of the second end face of the honeycomb structure.

Comparative Example 1

An exhaust gas treatment device including a bonded type honeycomb structure was manufactured in the same manner as in Example 1. In Comparative Example 1, a coating layer on the peripheral face has a uniform thickness of 0.2 mm along the length of the honeycomb structure.

With the same method as in Example 1, a regeneration test was carried out on the exhaust gas treatment device in which the honeycomb structure is mounted. After the test, damage was observed in the vicinity of the second end face of the honeycomb structure.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A honeycomb structure, comprising:
a first end face and a second end face substantially parallel to each other;
a peripheral face interconnecting the first end face and the second end face;
a ceramic block including plural through cells with partition walls inbetween, the cells extending from the first end face to the second end face; and
a coating layer forming the peripheral face of the honeycomb structure;
wherein a thickness of the coating layer at the second end face is greater than at the first end face, and at least some of the plural through cells each have a cross-sectional area parallel to the first end face that increases from the first end face toward the second end face.

2. The honeycomb structure as claimed in claim 1, wherein the coating layer includes a portion where the thickness monotonically increases from the first end face toward the second end face, or includes both a portion where the thickness monotonically increases from the first end face toward the second end face and a portion where the thickness is substantially uniform.

3. The honeycomb structure as claimed in claim 1, wherein the thickness of the coating layer linearly increases from the first end face toward the second end face.

4. The honeycomb structure as claimed in claim 1, wherein a cross-sectional area of the honeycomb structure parallel to the first end face is substantially uniform from the first end face to the second end face.

5. The honeycomb structure as claimed in claim 1, wherein a cross-sectional area of the honeycomb structure parallel to the first end face increases from the first end face toward the second end face.

6. The honeycomb structure as claimed in claim 1, wherein both the first and second end faces are circular.

7. The honeycomb structure as claimed in claim 1, wherein the through cells have at least two shapes when viewed from the first end face.

8. The honeycomb structure as claimed in claim 1, wherein either end of each of the through cells is sealed.

9. The honeycomb structure as claimed in claim 1, wherein a catalyst is deposited in the partition wall.

10. The honeycomb structure as claimed in claim 1, wherein the partition wall has a thickness in a range of about 0.1 mm through about 0.6 mm.

11. The honeycomb structure as claimed in claim 10, wherein the partition wall has a thickness in a range of about 0.1 mm through about 0.3 mm.

12. The honeycomb structure as claimed in claim 1, wherein the ceramic block is an integrated type ceramic block manufactured by integral molding.

13. The honeycomb structure as claimed in claim 12, wherein the ceramic block is made of cordierite or aluminum titanate.

14. The honeycomb structure as claimed in claim 1, wherein the ceramic block includes plural pillar ceramic units and adhesive layers bonding the pillar ceramic units to each other.

15. The honeycomb structure as claimed in claim 14, wherein the ceramic units are made of silicon carbide-based ceramic.

16. An exhaust gas treatment device comprising:
an inlet portion and an outlet portion for exhaust gas; and
the honeycomb structure of claim 1 between the inlet portion and the outlet portion;
wherein the first end face of the honeycomb structure faces the inlet portion for exhaust gas.

17. The exhaust gas treatment device as claimed in claim 16, wherein the coating layer includes a portion where the thickness monotonically increases from the first end face toward the second end face, or includes both a portion where the thickness monotonically increases from the first end face toward the second end face and a portion where the thickness is substantially uniform.

18. The exhaust gas treatment device as claimed in claim 16, wherein the thickness of the coating layer linearly increases from the first end face toward the second end face.

19. The exhaust gas treatment device as claimed in claim 16, wherein a cross-sectional area of the honeycomb structure parallel to the first end face is substantially uniform from the first end face to the second end face.

20. The exhaust gas treatment device as claimed in claim 16, wherein both the first and second end faces are circular.

21. The exhaust gas treatment device as claimed in claim 16, wherein the through cells have at least two shapes when viewed from the first end face.

22. The exhaust gas treatment device as claimed in claim 16, wherein either end of each of the through cells is sealed.

23. The exhaust gas treatment device as claimed in claim 16, wherein a catalyst is deposited in the partition wall.

24. The exhaust gas treatment device as claimed in claim 16, wherein the partition wall has a thickness in a range of about 0.1 mm through about 0.6 mm.

25. The exhaust gas treatment device as claimed in claim 24, wherein the partition wall has a thickness in a range of about 0.1 mm through about 0.3 mm.

26. The exhaust gas treatment device as claimed in claim 16, wherein the ceramic block is an integrated type ceramic block manufactured by integral molding.

27. The exhaust gas treatment device as claimed in claim 26, wherein the ceramic block is made of cordierite or aluminum titanate.

28. The exhaust gas treatment device as claimed in claim 16, wherein the ceramic block includes plural pillar ceramic units and adhesive layers bonding the pillar ceramic units to each other.

29. The exhaust gas treatment device as claimed in claim 28, wherein the ceramic units are made of silicon carbide-based ceramic.

30. An exhaust gas treatment device comprising:
an inlet portion and an outlet portion for exhaust gas; and
a honeycomb structure between the inlet portion and the outlet portion. the honeycomb structure, comprising:
a first end face and a second end face substantially parallel to each other;
a peripheral face interconnecting the first end face and the second end face;
a ceramic block including plural through cells with partition walls inbetween, the cells extending from the first end face to the second end face; and
a coating layer forming the peripheral face of the honeycomb structure;
wherein a thickness of the coating layer at the second end face is greater than at the first end face,
wherein the first end face of the honeycomb structure faces the inlet portion for exhaust gas, and
wherein a cross-sectional area of the honeycomb structure parallel to the first end face increases from the first end face toward the second end face.

* * * * *